(12) United States Patent
Zamkochyan

(10) Patent No.: US 10,240,705 B1
(45) Date of Patent: Mar. 26, 2019

(54) METHOD FOR NOTIFICATION OF SEWER LINE CONTENTS

(71) Applicant: Petros Zamkochyan, Sun Valley, CA (US)

(72) Inventor: Petros Zamkochyan, Sun Valley, CA (US)

( * ) Notice: Subject to any disclaimer, the term of this patent is extended or adjusted under 35 U.S.C. 154(b) by 0 days.

(21) Appl. No.: 14/752,560

(22) Filed: Jun. 26, 2015

Related U.S. Application Data

(60) Provisional application No. 62/019,296, filed on Jun. 30, 2014.

(51) Int. Cl.
*F16L 55/00* (2006.01)

(52) U.S. Cl.
CPC .................................. *F16L 55/00* (2013.01)

(58) Field of Classification Search
CPC ...................................................... F16L 55/00
See application file for complete search history.

(56) References Cited

U.S. PATENT DOCUMENTS

| | | | | |
|---|---|---|---|---|
| 5,733,444 | A * | 3/1998 | Johnson | E03F 5/0401 210/163 |
| 5,769,565 | A * | 6/1998 | Martin, Jr. | E03F 5/02 137/370 |
| 7,735,512 | B1 * | 6/2010 | Ismert | E03F 5/0407 137/362 |
| 2007/0028831 | A1 * | 2/2007 | Aniban, Jr. | G01F 23/64 116/228 |
| 2007/0040375 | A1 * | 2/2007 | Fierst | F16L 1/11 285/93 |
| 2008/0173360 | A1 * | 7/2008 | Wander | E03F 5/042 137/515 |
| 2008/0314468 | A1 * | 12/2008 | Houghton | F16L 1/11 138/89 |
| 2009/0211170 | A1 * | 8/2009 | Burlando | E02D 29/14 52/20 |
| 2010/0037969 | A1 * | 2/2010 | Fierst | F16L 1/11 138/89 |
| 2010/0171623 | A1 * | 7/2010 | James | E03C 1/242 340/608 |
| 2014/0202375 | A1 * | 7/2014 | Goff | G01F 23/58 116/228 |
| 2015/0129073 | A1 * | 5/2015 | Quagliani | F17D 5/02 138/89 |

* cited by examiner

*Primary Examiner* — Craig Schneider
*Assistant Examiner* — David Deal
(74) *Attorney, Agent, or Firm* — Roy L Anderson

(57) ABSTRACT

A clean out notification disc is placed in a clean out underneath a clean out cover to provide a durable notification mechanism of certain conditions of a main sewer line, such as, for example, the existence of a sewer liner, a backflow valve or a grease trap.

17 Claims, 2 Drawing Sheets

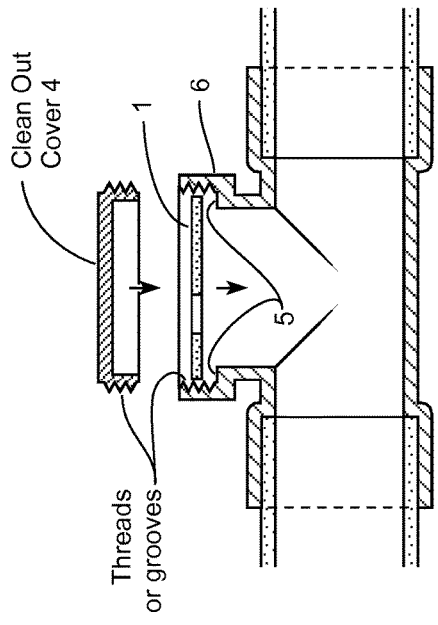
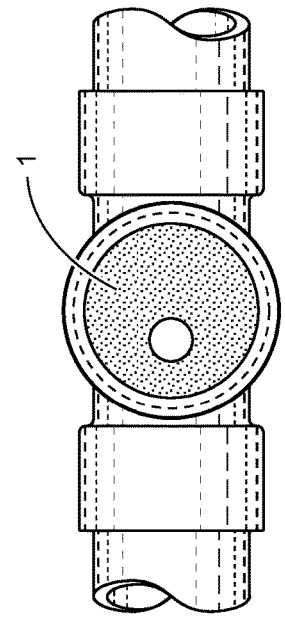
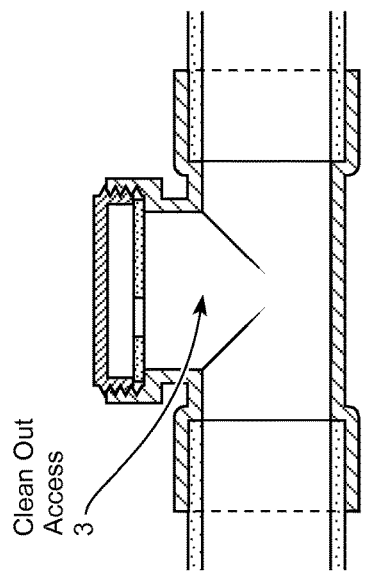
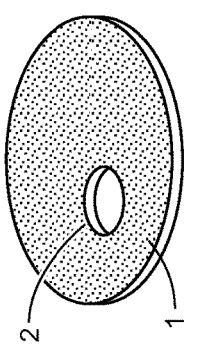
Fig. 1A
Fig. 1B
Fig. 1C
Fig. 1D

METHOD FOR NOTIFICATION OF SEWER LINE CONTENTS

FIELD OF THE INVENTION

The field of the present invention is in plumbing and, more particularly, to plumbing as it relates to accessing a clean out in a main line for a structure running into a main city line.

BACKGROUND OF THE INVENTION

Main sewer lines for structures, such as homes, restaurants and commercial buildings, run from a city sewer line at one end into the structure at the other end and are accessed by a capped clean out that is usually located proximate the structure. If the main sewer line becomes clogged, a snake or augur can be run into it through the clean out once the clean out cover is removed.

Sometimes main sewer lines, especially for older structures, become broken, cracked, offset or collapsed due to issues such as roots, frozen ground and settling of ground. When a main sewer line becomes damaged, it can be expensive to dig it up and replace it with new pipe, which is one reason why trenchless repair methods have become popular. One trenchless repair method is to install a pipe liner which is cured in place in the pipe. When such a repair has been made, an augur should not be used in the repaired pipe, after curing, because it can break down the cured line. One way to provide notice of a trenchless repair to a main sewer liner is to place a sticker or tag on the clean out; however, if such sticker or tag is removed, or becomes unreadable over time, the sewer line can inadvertently be damaged by future plumbing operations to clean the main sewer line.

Some residential and other buildings install backflow valves to prevent the main sewer line from backing up into its adjacent structure and some municipalities require a notice to be placed on the clean out when a backflow valve has been installed.

Certain commercial structures, especially restaurants, install grease traps between the city sewer line and the clean out, and some municipalities require a notice to be placed on the clean out when a grease trap has been installed.

SUMMARY OF THE INVENTION

The present invention is generally directed to a clean out notification disc that is placed in a clean out underneath a clean out cover to provide a durable notification mechanism for notifying plumbers (and others) of certain conditions of a main sewer line, such as, for example, the existence of a sewer liner, a backflow valve or a grease trap. The clean out notification disc is constructed of material that will not degrade despite the harsh conditions of its use so that it will not fall into the clean out. One or more different clean out notification discs might be used to notify of separate conditions.

Accordingly, it is an object of the present invention to provide a clean out notification disc that is placed in a clean out underneath a clean out cover to provide a durable notification mechanism for notifying plumbers (and others) of certain conditions of a main sewer line.

This and further objects and advantages will be apparent to those skilled in the art in connection with the drawings and the detailed description of the invention set forth below.

BRIEF DESCRIPTION OF THE FIGURES

FIG. 1A is a cross sectional view illustrating a clean out with a cover in place and a clean out notification disc according to the present invention while FIG. 1B is an exploded view of the same. FIG. 1C is a top view illustrating a clean out notification disc while FIG. 1D is a top plan view illustrating the a clean out notification disc in place in a clean out with the clean out cover removed.

DETAILED DESCRIPTION OF THE INVENTION

Figure 1:
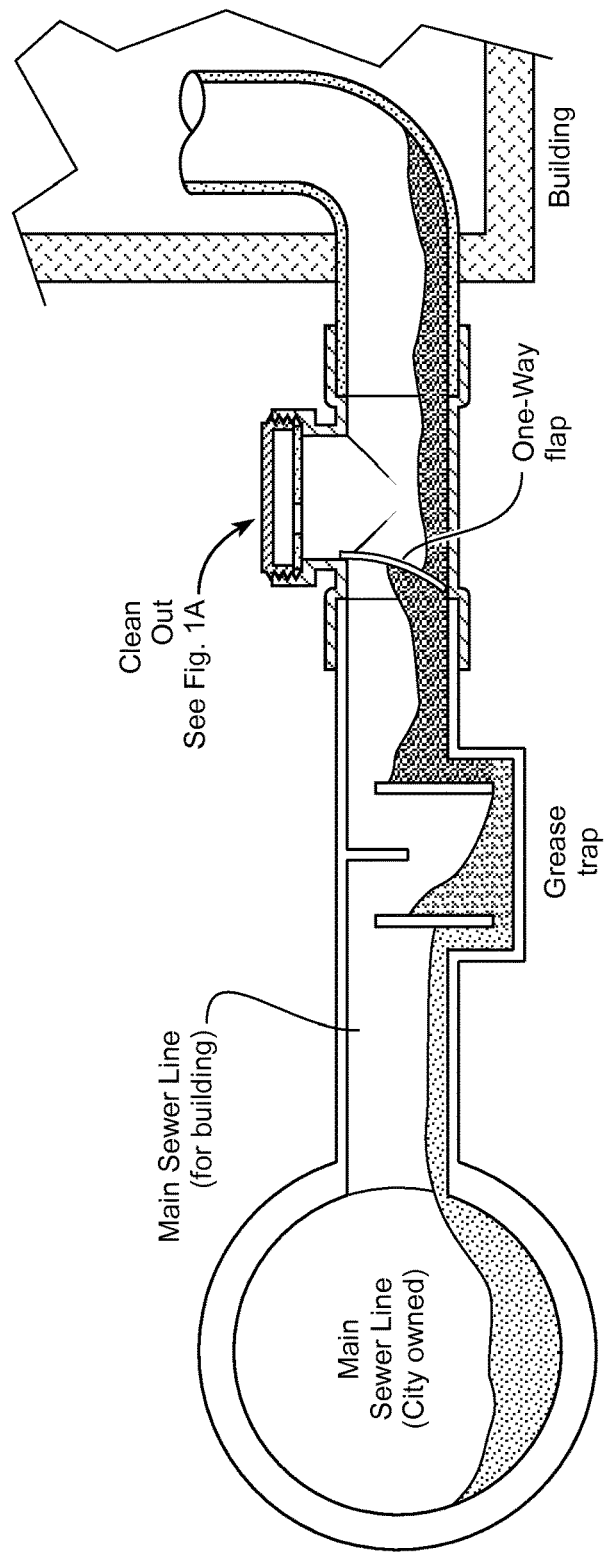
FIG. 1 illustrates a main sewer line between a building and city main sewer line with a clean out and also a backflow valve and a grease trip.

In accordance with the present invention, a clean out notification disc 1 is installed in a clean out 3 underneath a clean out cover 4 so as to provide notice to anyone accessing the clean out of relevant conditions of the clean out, such as a trenchless repair, or having something installed in the main sewer line, such as a grease trap or a backflow valve. Because the clean out is located between an origination point and the main city sewer line, the clean out notification disc provides a warning which notifies a view of the disc of a condition of the main sewer line located between the clean out and the main city sewer line.

In an especially preferred embodiment, clean out notification disc 1 of the present invention is a brightly colored disc made of a suitable plastic that will not degrade over time, such as ABS (acrylonitrile butadiene styrene) or high density polyethylene, which has an opening 2 which allows a finger or hook to hook the disc and remove it from the clean out. (Note that clean out notification disc 1 might also be made of metal or a ceramic material, or any other material, that is capable of withstanding the environmental conditions it would face, but it should be durable so that it will not shrink or become cracked and fall into the clean out, which might itself cause a potential problem.) Clean out notification disc should be sized so that it fits within clean out 3 when clean out cover 4 is removed, but large enough to insure that it will rest on a ledge 5 of clean out 3 which is typically located beneath pipe threads 6 used by clean out cover 4. Also, while it is especially preferred that clean out notification disc be circular, because that will allow for greatest stability in resting on ledge 5 of a circular pipe, the disc need not be circular and can take on any shape that allows clean out notification disc to be 35.365A secured within clean out 3 when cover 4 is in place and it is resting on ledge 5.

If clean out notification disc 1 is being used in a clean out of a main sewer line which has had a sewer lining replacement, and which therefore should not have cabling or an augur used in it because of resultant damage to the sewer lining, clean out notification disc 1 might include text (molded in the plastic) saying something to the effect of: Stop, Sewer Lining; No Cabling. In such a scenario, because of the size of clean out notification disc 1, and its strategic location, the sewer line could not be rooted until clean out notification disc 1 is in fact removed via use of opening 2.

The idea of using the clean out notification disc to provide a more or less permanent notification system of a condition of the main sewer line can easily be extended to other conditions, such as when notification of a backflow valve or grease trap is required. (Note that while FIG. 1 illustrates the presence of both a backflow valve and a grease trap, both need not be present in the same main sewer line.) In the case of any such condition, text or graphic materials used to provide the notification can be included on the top surface of the clean out notification disc visible once cover 4 is removed. Also, of course, different colors might be used to provide different notifications. In addition, one notification disc might provide notice of multiple conditions, or multiple notification discs can be stacked on top of each other inside of the clean out (and, optionally, such discs might have a mechanism, such as registration guides, for insuring that multiple openings 2 of multiple discs align with each other for easy removal).

In summary, once a condition is established in a main sewer line for which future notification is desired (or mandated), a clean out cover can be removed, a clean out notification can be placed inside of the clean out, and then the clean out cover can be replaced, insuring that the clean out notification disc will be present when the clean out cover is next removed.

While the invention has been described herein with reference to certain preferred embodiments, those embodiments have been presented by way of example only, and not to limit the scope of the invention. For example, the concepts applied herein can also be used to create information contained on a clean out notification disc that states a warning about contents in the sewer line. Also, there may be some instances where a vertical clean out is located inside of a structure, such as a commercial or industrial structure (note FIG. 1 illustrates a horizontal clean out), where it may be desirable to replace the cover of the internal vertical clean out with a cover containing a clean out notification similar to what has been described for use with the clean out notification disc. Additional embodiments thereof will be obvious to those skilled in the art having the benefit of this detailed description.

Accordingly, it will be apparent to those skilled in the art that still further changes and modifications in the actual concepts described herein can readily be made without departing from the spirit and scope of the disclosed inventions.

What is claimed is:

1. A method, comprising:
   removing a cap covering a clean out access point of a main sewer line which flows into a main city sewer line from an origination point upstream of the clean out access point;
   inserting a clean out notification disc into the clean out access point when there is a condition of the main sewer line which would be damaged by a snake or augur running into the main sewer line through the clean out; and
   replacing the cap so that it covers the clean out access point;
   wherein the clean out notification disc is secured between the cap and the sewer line; and
   wherein the clean out notification disc includes a warning which notifies a viewer of the disc of the condition of the main sewer line.

2. The method of claim 1, wherein the main sewer line cannot be accessed from the clean out access point without removing the clean out notification disc.

3. The method of claim 2, wherein the clean out notification disc is secured by placing it on a ledge in the clean out access point above the main sewer line.

4. The method of claim 3, wherein the clean out notification disc is removed from the clean out access point by inserting an extension through an opening in the clean out notification disc and pulling up on an underside surface of the clean out notification disc relative to the main sewer line.

5. The method of claim 1, wherein the clean out notification disc is selected so that it contains an identification indicia indicative of one of the following two conditions: either that a sewer lining is present in the main sewer line, which means that cabling or an augur will damage the sewer lining, or that a grease trap is present downstream of the access point in the main sewer line relative to the main city sewer line.

6. The method of claim 1, wherein the clean out notification disc is placed in the clean out access point to indicate that a sewer lining is present in the main sewer line.

7. The method of claim 1, wherein the clean out notification disc is placed in the clean out access point to indicate that a grease trap is present downstream of the access point in the main sewer line relative to the main city sewer line.

8. The method of claim 1 wherein the clean out notification disc does not create a seal in the clean out access point above the main sewer line.

9. A system, comprising:
   a main sewer line which flows into a main city sewer line from an origination point which has a condition which would be damaged by a snake or augur running into the main sewer line;
   a sewer line access point located between the origination point and the main city sewer line that is connected to the main sewer line to provide access to the main sewer line;
   a cap that covers the sewer line access point; and
   a clean out notification disc secured between the cap and the main sewer line;
   wherein the clean out notification disc includes a warning which notifies a viewer of the disc of the condition of the main sewer line located between the clean out access point and the main city sewer line.

10. The system of claim 9, wherein the main sewer line cannot be accessed from a clean out access point without removing the clean out notification disc.

11. The system of claim 10, wherein the clean out notification disc rests on a ledge in the clean out access point above the main sewer line.

12. The system of claim 10, wherein the clean out notification disc contains an opening that provides access so that an underside surface of the clean out notification disc can be accessed to pull the clean out notification disc out of the clean out access point.

13. The system of claim 9, wherein the clean out notification disc contains an identification indicia indicative of one of the following two conditions: either that a sewer lining is present in the main sewer line, which means that cabling or an augur will damage the sewer lining, or that a grease trap is present downstream of the access point in the main sewer line relative to the main city sewer line.

14. The system of claim 9, wherein the clean out notification disc is comprised of a material that is capable of withstanding exposure to environmental conditions existing in the main sewer line.

15. The system of claim 9, wherein the clean out notification disc is comprised of a circular disc.

16. The system of claim 9, further comprising a second clean out notification disc located between the cap and the clean out notification disc which includes a second warning which notifies the viewer of the second disc of a second condition of the main sewer line located between the clean out access point and the main city sewer line.

17. The system of claim 9 wherein the clean out notification disc does not create a seal in the clean out access point above the main sewer line.

\* \* \* \* \*